(12) United States Patent
Aas

(10) Patent No.: US 12,337,484 B2
(45) Date of Patent: Jun. 24, 2025

(54) ROBOT WITH SMART TRAJECTORY RECORDING

(71) Applicant: Lincoln Global, Inc., Santa Fe Springs, CA (US)

(72) Inventor: Jacob F. Aas, Windsor, CO (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 293 days.

(21) Appl. No.: 18/127,766

(22) Filed: Mar. 29, 2023

(65) Prior Publication Data

US 2023/0234230 A1 Jul. 27, 2023

Related U.S. Application Data

(63) Continuation-in-part of application No. 17/880,802, filed on Aug. 4, 2022, now Pat. No. 12,172,318.

(Continued)

(51) Int. Cl.
*B25J 9/16* (2006.01)
*B23K 9/127* (2006.01)
*B25J 11/00* (2006.01)

(52) U.S. Cl.
CPC ............. *B25J 9/1666* (2013.01); *B23K 9/127* (2013.01); *B25J 11/005* (2013.01)

(58) Field of Classification Search
CPC ...... B25J 9/1666; B25J 11/005; B25J 9/1676; B23K 9/127; B23K 9/0953; B23K 9/32;

(Continued)

(56) References Cited

U.S. PATENT DOCUMENTS 4,224,501 A 9/1980 Lindbom et al.
4,380,696 A 4/1983 Masaki
(Continued)

FOREIGN PATENT DOCUMENTS

CN 109318232 A 2/2019
CN 209919892 U 1/2020
(Continued)

OTHER PUBLICATIONS

Ni, et al.; "Haptic and Visual Augmented Reality Interface for Programming Welding Robots;" Advanced Manufacturing, vol. 5; Dated Aug. 18, 2017; pp. 191-198.

(Continued)

*Primary Examiner* — Bhavesh V Amin
(74) *Attorney, Agent, or Firm* — David J. Muzilla

(57) ABSTRACT

An embodiment includes a method of determining a collision-free space for a robotic welding system. The method includes fixing a location of a part to be welded in a 3D coordinate space of a robotic welding system. An arm of the robotic welding system is moved around the part within the 3D coordinate space. Data corresponding to positions and orientations of the arm in the 3D coordinate space are recorded as the arm is moved within the 3D coordinate space around the part. The data is translated to swept volumes of data within the 3D coordinate space. The swept volumes of data are merged to generate 3D geometry data representing a continuous collision-free space within the 3D coordinate space.

20 Claims, 13 Drawing Sheets

Related U.S. Application Data

(60) Provisional application No. 63/280,289, filed on Nov. 17, 2021.

(58) Field of Classification Search
CPC ............ B23K 9/16; G05B 2219/39131; G05B 2219/40339; G05B 2219/45104
See application file for complete search history.

(56) References Cited

U.S. PATENT DOCUMENTS

| | | |
|---|---|---|
| 6,492,618 B1 | 12/2002 | Flood et al. |
| 7,353,081 B2 | 4/2008 | Skourup et al. |
| 8,386,080 B2 | 2/2013 | Bosscher et al. |
| 8,680,434 B2 | 3/2014 | Stöger et al. |
| 8,843,236 B2 | 9/2014 | Barajas et al. |
| 8,996,167 B2 | 3/2015 | Linder et al. |
| 9,056,396 B1 | 6/2015 | Linnell |
| 9,110,466 B2 | 8/2015 | Yanagawa et al. |
| 9,718,189 B2 | 8/2017 | Atohira et al. |
| 9,833,857 B2 | 12/2017 | Artelsmair |
| 9,844,622 B2 | 12/2017 | Savage |
| 9,895,803 B1 | 2/2018 | Oslund |
| 9,919,424 B1 | 3/2018 | Devengenzo |
| 9,993,222 B2 | 6/2018 | Azizian et al. |
| 10,131,012 B2 | 11/2018 | Cenko |
| 10,596,700 B2 | 3/2020 | Corkum et al. |
| 10,766,140 B2 | 9/2020 | Krasny et al. |
| 11,067,965 B2 | 7/2021 | Spieker et al. |
| 11,148,285 B2 | 10/2021 | Mönnich |
| 11,407,111 B2 | 8/2022 | Zhang et al. |
| 2015/0094855 A1 | 4/2015 | Chemouny et al. |
| 2019/0086907 A1 | 3/2019 | Oestergaard et al. |
| 2020/0139474 A1 | 5/2020 | Mayer et al. |
| 2020/0198140 A1 | 6/2020 | Dupuis et al. |
| 2021/0170515 A1 | 6/2021 | Oh |
| 2022/0032461 A1 | 2/2022 | Gupta et al. |
| 2022/0234775 A1* | 7/2022 | Lopez-Arostegui Saenz ............... B65B 51/303 |
| 2023/0234230 A1* | 7/2023 | Aas .................. B25J 11/005 700/255 |

FOREIGN PATENT DOCUMENTS

| | | |
|---|---|---|
| JP | 2020-189304 A | 11/2020 |
| WO | 2011/039542 A1 | 4/2011 |
| WO | 2021/069433 A1 | 4/2021 |
| WO | 2022/119934 A1 | 6/2022 |
| WO | 2022/136865 A1 | 6/2022 |
| WO | 2023/038942 A2 | 3/2023 |

OTHER PUBLICATIONS

Ang, et al.; "A Walk-Through Programmed Robot for Welding in Shipyards;" Industrial Robot, vol. 26, No. 5; Dated Jul. 1999; pp. 377-388.

International Search Report from Corresponding Application No. PCT/US2022/049954; Dated Mar. 15, 2023; pp. 1-6.

Wang, et al.; "A Survey of Welding Robot Intelligent Path Optimization;" Journal of Manufacturing Processes; https://doi.org/10.1016/j.jmapro.2020.04.085; Dated Apr. 29, 2020; pp. 1-10.

Fang, et al.; "Robot Path Planning Optimization for Welding Complex Joints;" International Journal of Advanced Manufacturing Technology; https://sci-hub.se/https://doi.org/10.1007/s00170-016-9684-z; Published Nov. 15, 2016; pp. 1-11.

\* cited by examiner

ROBOT WITH SMART TRAJECTORY RECORDING

CROSS REFERENCE TO RELATED APPLICATION/INCORPORATION BY REFERENCE

This U.S. patent application is a continuation-in-part (CIP) patent application of U.S. patent application Ser. No. 17/880,802 filed on Aug. 4, 2022 which claims priority to and the benefit of U.S. Provisional Patent Application Ser. No. 63/280,289 filed on Nov. 17, 2021, which are incorporated by reference herein in their entirety. U.S. Published Patent Application No. 2020/0139474 A1 is incorporated by reference herein it its entirety. U.S. Pat. No. 9,833,857 B2 is incorporated by reference herein in its entirety.

FIELD

Embodiments of the present invention relate to the use of robots (e.g., collaborative robots or cobots, or more traditional industrial robots) for welding or cutting. More specifically, embodiments of the present invention relate to systems and methods for recording robot path traversals and creating associated motion programs in a more efficient manner.

BACKGROUND

Programming motion trajectories of a robot (e.g., a collaborative robot or an industrial robot) prior to actual welding or cutting can be quite complicated. In addition to the challenges associated with programming a weld trajectory along a weld joint, other challenges associated with programming an ingress trajectory toward a weld joint and an egress trajectory away from a weld joint exist. Furthermore, avoiding collisions of the robot with other objects within the welding or cutting environment provide even more challenges.

SUMMARY

An embodiment includes a method of determining a collision-free space for a robotic welding system. The method includes fixing a location of a part to be welded in a 3D coordinate space of a robotic welding system. An arm of the robotic welding system is moved around the part within the 3D coordinate space. Data corresponding to positions and orientations of the arm in the 3D coordinate space are recorded as the arm is moved within the 3D coordinate space around the part. The data is translated to swept volumes of data within the 3D coordinate space. The swept volumes of data are merged to generate 3D geometry data representing a continuous collision-free space within the 3D coordinate space. The method may further include planning a collision-free motion path of the arm through the 3D coordinate space using at least the 3D geometry data representing the continuous collision-free space. The method may also include planning a collision-free air motion path within the 3D coordinate space from an end point of a first weld seam of the part to a start point of a second weld seam of the part using position data of the end point, position data of the start point, and the 3D geometry data representing the continuous collision-free space. The method may include planning a collision-free welding path within the 3D coordinate space from a start point of a weld seam of the part to an end point of the weld seam of the part using at least position data of the start point, position data of the end point, and the 3D geometry data representing the continuous collision-free space. The arm of the robotic welding system is represented by the robotic welding system as data of 3D geometric volumes that occupy space within the 3D coordinate space. Moving the arm of the robotic welding system around the part within the 3D coordinate space may be accomplished manually by a user, in one embodiment. Moving the arm of the robotic welding system around the part within the 3D coordinate space may be accomplished automatically by a controller of the robotic welding system running a collision-free space search algorithm, in one embodiment. In one embodiment, the recording, translating, and merging are accomplished by a controller of the robotic welding system running a collision-free space determination algorithm. In one embodiment, the data corresponding to the positions and the orientations of the arm in the 3D coordinate space are represented by x, y, z location data and roll, pitch, yaw orientation data corresponding to joints of the arm. Coordinate transformation mathematics is performed by a controller of the robotic welding system to accomplish the translating and the merging, in one embodiment.

An embodiment includes a method of determining a collision-free space for a robotic welding system. The method includes moving a positioner mechanism in coordination with moving an arm of a robotic welding system through a 3D space of a welding environment, wherein the positioner mechanism is holding a part to be welded, and wherein the robotic welding system has coordinated kinematic control of the arm and the positioner mechanism. Higher-dimensional joint space data is recorded, corresponding to combined positions and orientations of joints of the arm and joints of the positioner mechanism as the arm and the positioner mechanism are moved in coordination through the 3D space. The higher-dimensional joint space data is mapped to a continuous higher-dimensional volume space data that represents 3D volumes occupied by the arm, the positioner, and the part during the moving. The continuous higher-dimensional volume space data represents collision-free configurations of the arm, the positioner, and the part. The method may further include planning a collision-free motion path of the arm and the positioner mechanism through the 3D space using at least the continuous higher-dimensional volume space data representing the collision-free configurations. The method may also include planning a collision-free air motion path within the 3D space from an end point of a first weld seam of the part to a start point of a second weld seam of the part using position data of the end point, position data of the start point, and the continuous higher-dimensional volume space data representing the collision-free configurations. The method may also include planning a collision-free welding path within the 3D space from a start point of a weld seam of the part to an end point of the weld seam of the part using at least position data of the start point, position data of the end point, and the continuous higher-dimensional volume space data representing the collision-free configurations. In one embodiment, the arm of the robotic welding system and the positioner mechanism are represented within the robotic welding system as data of 3D geometric volumes that occupy the 3D space. In one embodiment, moving the arm of the robotic welding system in coordination with the positioner mechanism within the 3D space is accomplished automatically by a controller of the robotic welding system running a collision-free space search algorithm. The recording and mapping are accomplished by a controller of the robotic welding system running a collision-free space determination algorithm, in accordance with one embodiment. The higher-dimensional joint space data, corresponding to combined positions and orientations of joints of the arm and joints of the positioner mechanism, are represented by x, y, z location data and roll, pitch, yaw orientation data. In one embodiment, coordinate transformation mathematics is performed by a controller of the robotic welding system to accomplish the mapping. In one embodiment, the arm is holding a welding tool as the arm is moving.

In one embodiment, the motion of the tool center point (TCP) of a robot is automatically recorded as an operator moves the arm of the robot within the workspace. A welding tool (e.g., a welding gun or torch) is attached to the end of the robot arm (with respect to the TCP) and the robot is calibrated to know where the TCP is located in three-dimensional space with respect to at least one coordinate system (e.g., the coordinate system of the robot and/or of the workspace). The operator pushes an actuator (e.g., a button or a switch) and proceeds to move the robot arm in space (e.g., ingress towards a weld joint to be welded, across the weld joint, and/or egress away from the weld joint). Pushing of the actuator starts the robot to record the position of the TCP (and effectively the tip of the welding gun/torch) in 3D space as the operator moves the robot arm. The operator does not have to subsequently push a button or do anything else to cause multiple position points to be recorded along the trajectory that the robot arm takes. Multiple position points defining the trajectory are recorded automatically as the operator moves the robot arm, and a motion program for the robot is automatically created. The number of recorded points is based on a distance traveled, in accordance with one embodiment. When the operator has completed moving the robot arm along the desired trajectory, the operator can push the same actuator again (or a different actuator) to stop the recording.

In one embodiment, a system may include a "smart" welding torch that attaches to the arm of a robot and which can be moved along a desired welding path to program the desired welding path into a controller of the robot via actuators on the "smart" welding torch. In an alternative embodiment, the torch can be a "smart" cutting torch for performing cutting operations instead of welding operations.

In one embodiment, a welding system for generating a motion program is provided. The welding system includes a robot (e.g., a collaborative robot) having an arm and a calibrated tool center point (TCP). The welding system also includes a welding tool connected to a distal end of the arm of the robot in a determined relation to the TCP. The welding system further includes a programmable robot controller and a servo-mechanism apparatus configured to move the arm of the robot under the command of the programmable robot controller via a motion program. The welding system also includes an actuator operatively connected to the programmable robot controller. The welding system is configured to allow an operator to activate the actuator and proceed to manually move the arm of the robot in a 3D space from a start point to a destination point, defining an operator path. For example, the operator path may be an ingress path toward a work piece, or an egress path away from a work piece. Activation of the actuator commands the programmable robot controller to record a plurality of spatial points of the TCP in the 3D space as the operator manually moves the arm of the robot along the operator path. The operator does not have to subsequently activate any actuator to cause the plurality of spatial points to be recorded along the operator path that the arm of the robot takes when manually moved by the operator. The programmable robot controller is configured to identify and eliminate extraneous spatial points from the plurality of spatial points as recorded, leaving a subset of the plurality of spatial points as recorded, where the extraneous spatial points are a result of extraneous movements of the arm of the robot by the operator. In one embodiment, the extraneous spatial points are identified by the robot controller at least in part by the controller analyzing the plurality of spatial points as recorded to determine which spatial points of the plurality of spatial points as recorded are not needed to accomplish moving from the start point to the destination point within the 3D space. In one embodiment, the programmable robot controller is configured to perform a spatial smoothing operation on the subset of the plurality of spatial points as recorded, resulting in a smoothed trajectory of spatial points, and the programmable robot controller is configured to automatically generate the motion program for the robot corresponding to the smoothed trajectory of spatial points. In one embodiment, the programmable robot controller is configured to perform a spatial interpolation operation on the subset of the plurality of spatial points as recorded, resulting in an interpolated trajectory of spatial points. The programmable robot controller is configured to perform a spatial smoothing operation on the interpolated trajectory of spatial points as recorded, resulting in a smoothed trajectory of spatial points, and the programmable robot controller is configured to automatically generate the motion program for the robot corresponding to the smoothed trajectory of spatial points.

In one embodiment, a robotic welding system for generating a motion program is provided. The robotic welding system includes a programmable robot controller of a robot (e.g., a collaborative robot) having a computer processor and a computer memory. The programmable robot controller is configured to digitally record, in the computer memory, a plurality of spatial points along an operator path in a 3D space taken by a calibrated tool center point (TCP) of the robot as an operator manually moves a robot arm of the robot along the operator path from a start point to a destination point within the 3D space. For example, the operator path may be an ingress path toward a work piece, or an egress path away from a work piece. The programmable robot controller is also configured to identify and eliminate, from the computer memory, extraneous spatial points from the plurality of spatial points as digitally recorded, leaving a subset of the plurality of spatial points as digitally recorded, where the extraneous spatial points are a result of extraneous movements of the robot arm by the operator. In one embodiment, the extraneous spatial points are identified by the programmable robot controller at least in part by the programmable robot controller analyzing the plurality of spatial points as digitally recorded to determine which spatial points of the plurality of spatial points as digitally recorded are not needed to accomplish moving from the start point to the destination point within the 3D space. In one embodiment, the programmable robot controller is configured to perform a spatial smoothing operation on the subset of the plurality of spatial points as recorded, resulting in a smoothed trajectory of spatial points, and the programmable robot controller is configured to automatically generate a motion program for the robot corresponding to the smoothed trajectory of spatial points. In one embodiment, the programmable robot controller is configured to perform a spatial interpolation operation on the subset of the plurality of spatial points as recorded, resulting in an interpolated trajectory of spatial points. The programmable robot controller is configured to perform a spatial smoothing operation on the interpolated trajectory of spatial points as recorded, resulting in a smoothed trajectory of spatial points, and automatically generate a motion program for the robot corresponding to the smoothed trajectory of spatial points.

Numerous aspects of the general inventive concepts will become readily apparent from the following detailed description of exemplary embodiments, from the claims, and from the accompanying drawings.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
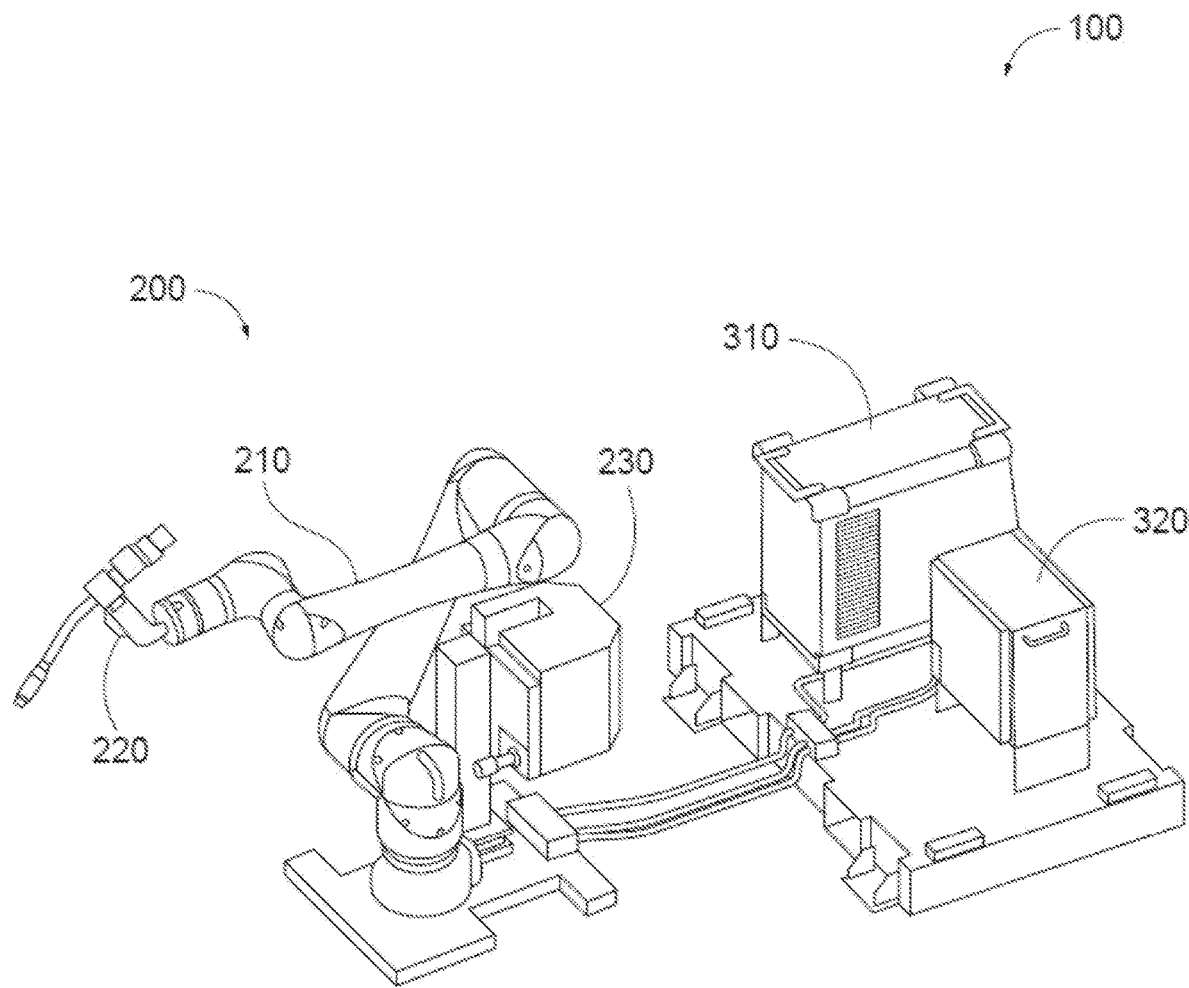
FIG. 1 illustrates one embodiment of a welding system having a collaborative robot.
Figure 2:
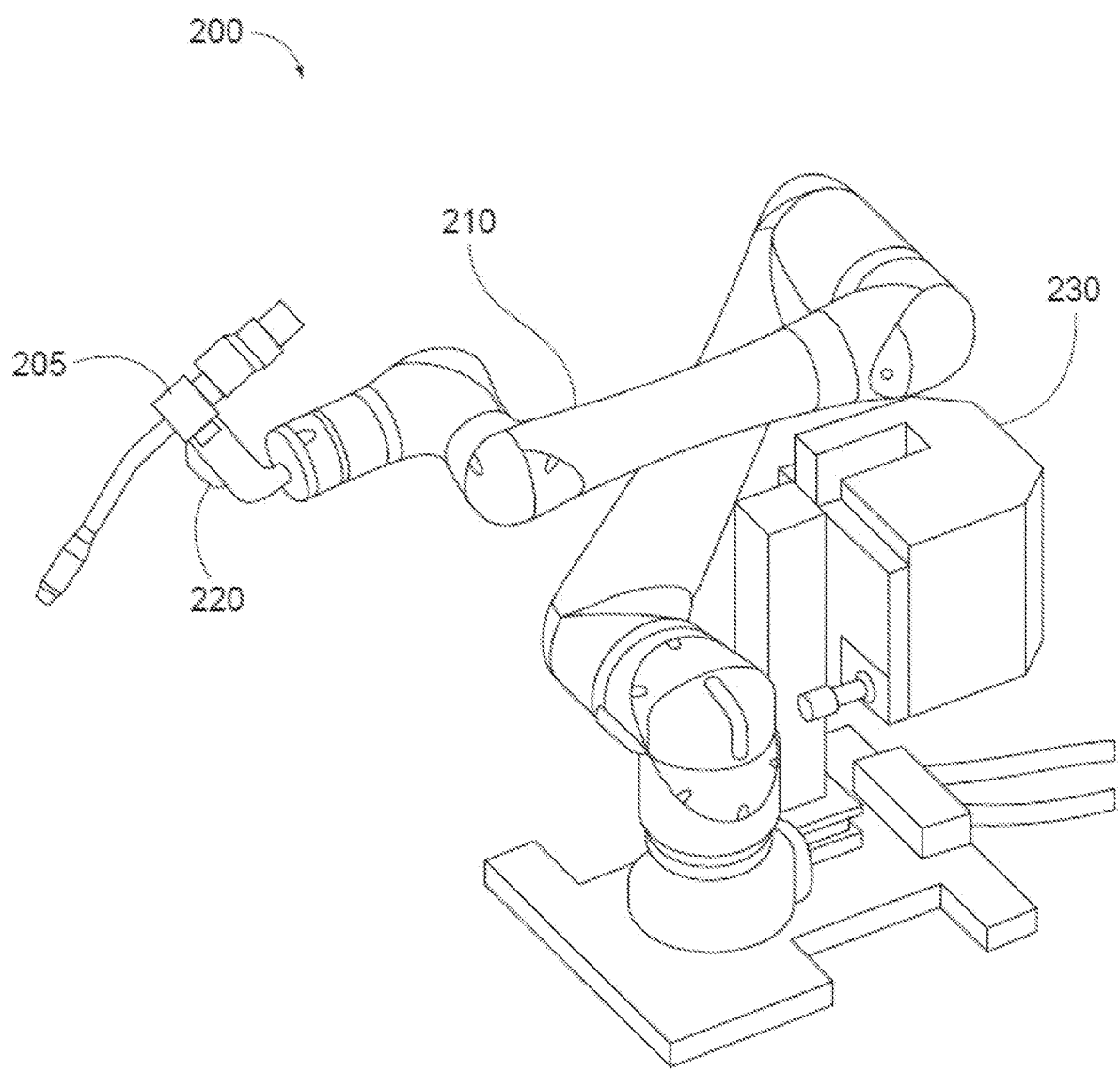
FIG. 2 illustrates one embodiment of the collaborative robot of FIG. 1.

The examples and figures herein are illustrative only and are not meant to limit the subject invention, which is measured by the scope and spirit of the claims. Referring now to the drawings, wherein the showings are for the purpose of illustrating exemplary embodiments of the subject invention only and not for the purpose of limiting same, FIG. 1 illustrates one embodiment of a welding system 100 having a collaborative robot 200. FIG. 2 illustrates one embodiment of the collaborative robot 200 of FIG. 1. The term welding system or robotic welding system as used herein may refer to a collaborative robotic welding system or an industrial robotic welding system, for example.

Referring to FIG. 1 and FIG. 2, the welding system 100 includes a collaborative robot 200, a welding power supply 310, and a programmable robot controller 320. The collaborative robot 200 has an arm 210 configured to hold a welding torch (e.g., a welding gun) 220. The terms "torch" and "gun" are used herein interchangeably. The collaborative robot 200 also includes a servo-mechanism apparatus 230 configured to move the arm 210 of the collaborative robot 200 under the command of the robot controller 320 (via a motion program). In one embodiment, the welding system 100 includes a wire feeder (not shown) to feed welding wire to the welding torch 220.

In one embodiment, the motion of the calibrated tool center point (TCP 205) of a cobot (and effectively the tip of the welding gun/torch 220) is recorded as an operator moves the arm of the cobot within the workspace. A welding gun/torch 220 is attached to the end of the cobot arm 210 (with respect to the TCP) and the cobot is calibrated to know where the TCP is located in three-dimensional space with respect to a coordinate system (e.g., the coordinate system of the cobot). The operator pushes an actuator (e.g., a button or a switch) and proceeds to move the cobot arm in space (e.g., ingress towards a weld joint to be welded, across the weld joint, or egress away from the weld joint). The trajectories associated with ingress and egress are known herein as "air move" trajectories, since they are trajectories in the air and not at the weld joint. Pushing of the actuator starts the cobot to record the position of the TCP (and effectively the tip of the welding gun/torch) in 3D space (e.g., as coordinate points) as the operator moves the cobot arm. Another actuator 224 (e.g., see FIG. 4 herein) may be provided to allow the arm to be unlocked so it can be moved by the operator (e.g., in the form of a "kill" switch).

In one embodiment, the welding torch 220 is a "smart" welding torch. The term "smart" is used herein to refer to certain programmable capabilities provided by the welding torch/gun 220 which are supported by the robot controller 320. In one embodiment, the welding torch 220 includes a torch body 226 (e.g., see FIG. 3 herein) configured to be operatively connected to the arm 210 of the collaborative robot 200. One actuator device 224 (e.g., see FIG. 4) on the torch body 226 is configured to be activated by a human user to enable the arm 210 of the collaborative robot, with the welding torch 220 connected, to be moved by the human user (operator) along a desired path (e.g., along an ingress path to a weld joint, along an egress path away from a weld joint, or along a weld joint itself along which the collaborative robot 200 is to make a weld). Another actuator device 222 (see FIG. 3 and FIG. 4) on the torch body is configured to be activated by the human user to initiate a recording cycle at a start point and to terminate the recording cycle at a destination or end point in three-dimensional (3D) space. The actuator devices 222 and 224 are configured to communicate with the robot controller 320 to record the weld points along the desired path. For example, a weld may be made along a desired welding path by the collaborative robot 200 using the welding torch 220 from the start point to the destination point.

The operator does not have to repetitively push a button (actuator) or do anything else to cause multiple position points to be recorded (e.g., by the cobot controller 320) along the trajectory that the cobot arm takes. Multiple position points (e.g., spatial coordinate points) defining the trajectory are recorded automatically as the operator moves the cobot arm, and a motion program for the cobot is automatically created (e.g., by the cobot controller 320). The number of recorded points is based on a distance traveled, in accordance with one embodiment. When the operator has completed moving the cobot arm along the desired trajectory, the operator can push the same actuator 222 again (or another actuator) to stop the recording. Therefore, for any single weld, no more than two button clicks are required. The actuator to start/stop recording may be located on the cobot arm, the cobot body, or the welding torch/gun, in accordance with various embodiments. Other locations within the system are possible as well.

In one embodiment, post-processing (e.g., spatial and/or temporal filtering) of the recorded position points (spatial points) is performed by the cobot welding system (e.g., by the cobot controller 320) and the motion program is updated accordingly. The post-processing results in smoothing the subsequent automatic movement of the cobot along the recorded trajectory as commanded by the motion program. For example, any unwanted jerky, non-uniform motion (e.g., in position and/or orientation) introduced by the operator when moving the cobot arm is vastly reduced, if not totally eliminated. More uniform time spacing between the recorded points is also provided. Furthermore, in accordance with one embodiment, programming of fine motion of the cobot arm is automated during post processing (e.g., for weaving along the weld joint, or when the welding torch/gun is rounding a corner of a weld).

Figure 3:
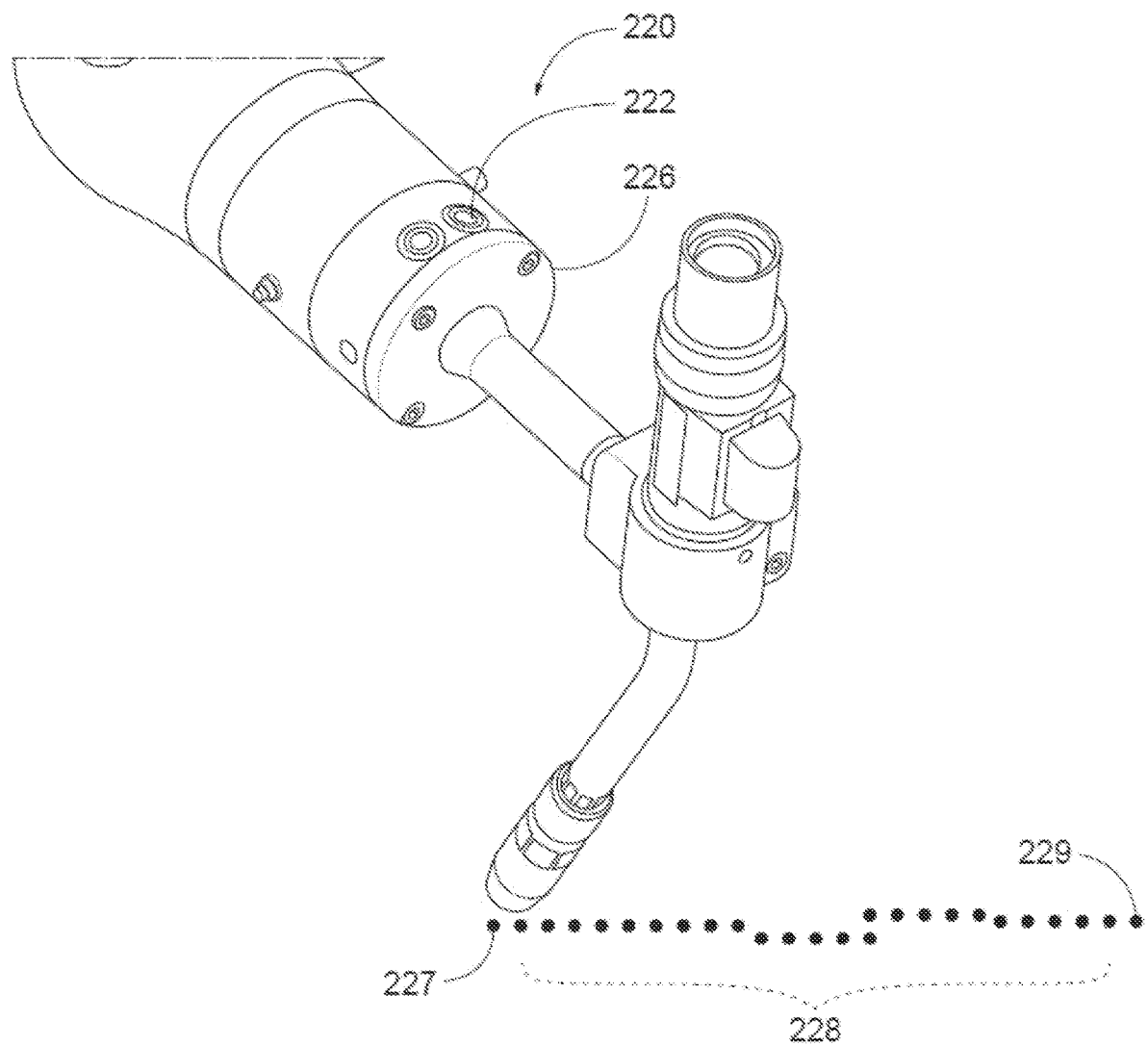
FIG. 3 illustrates one embodiment of a welding torch/gun attached to a distal end of an arm of the collaborative robot of FIG. 1 and FIG. 2.

FIG. 3 illustrates one embodiment of a "smart" welding torch 220 configured to be used by the collaborative robot 200. The "smart" welding torch 220 is configured to be operatively connected to (attached to) the arm 210 of the collaborative robot 200. The "smart" welding torch 220 includes a first actuator device 222 (e.g., a momentary push-button device). The first actuator device 222 is on the torch body 226 and is configured to be activated by a human user (operator) to initiate a recording cycle along a path, for example, at a start point 227 and to terminate the recording cycle, for example, at a destination point 229 in three-dimensional (3D) space.

In accordance with one embodiment, the first time the first actuator device 222 is pressed by the user, the recording cycle is started. The second time the first actuator device 222 is pressed by the user, the recording cycle is ended. The actuator device may be a momentary push-button device, a switch, or another type of actuator device, in accordance with various embodiments. Position points 227, 228, and 229 in three-dimensional space along the path are automatically recorded by the robot controller 320 as the operator moves the welding torch 220 (as attached to the cobot arm 210) along the path trajectory (before actual welding occurs). Again, an actuator does not have to be pushed or switched in order to indicate each position point to be recorded. Multiple position points (spatial points) defining the trajectory are recorded automatically as the operator moves the cobot arm, and a motion program for the cobot is automatically created. The number of recorded points is based on a distance traveled, in accordance with one embodiment.

Figure 4:
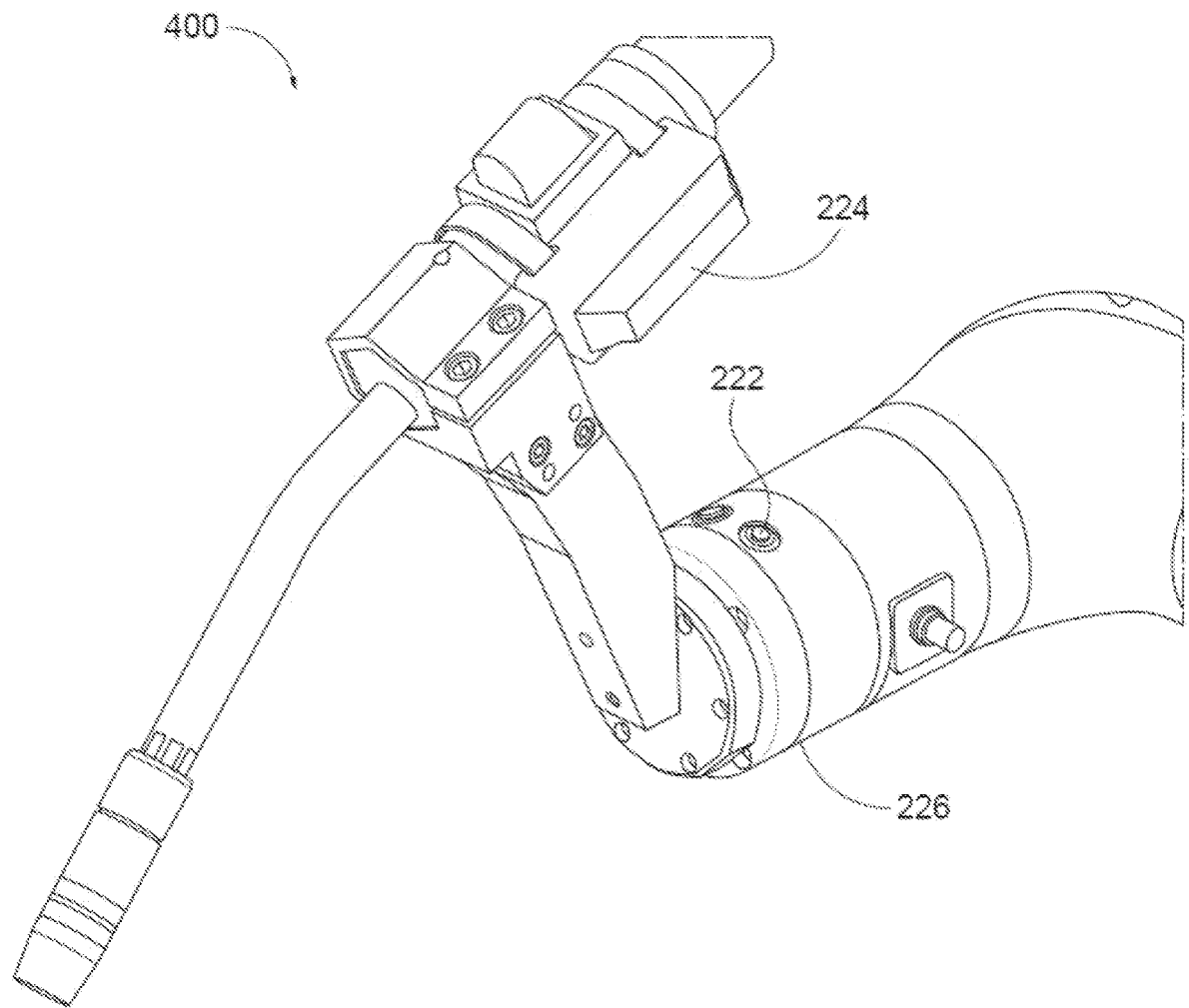
FIG. 4 illustrates another embodiment of a welding torch/gun attached to a distal end of an arm of the collaborative robot of FIG. 1 and FIG. 2.

FIG. 4 illustrates another embodiment of a welding torch/gun 400 attached to a distal end of an arm 210 of the collaborative robot 200 of FIG. 1 and FIG. 2. Referring to FIG. 4, in one embodiment, the "smart" welding torch 400 also includes a second actuator device 224 (e.g., configured as a dead man's switch). The second actuator device 224 on the torch body 226 is configured to be activated by a human user to enable the arm 210 of the collaborative robot 200, with the "smart" welding torch 400 connected, to be moved by the human user along a desired path (e.g., an ingress path, an egress path, or a weld path). The "smart" welding torch 400 allows the user to safely move the arm 210 of the robot 200 and create path programs (motion programs). When the user releases the second actuator device 224, the robot arm 210 cannot move (the arm is locked).

The first and second actuator devices 222 and 224 communicate, either directly or indirectly, with the robot controller 320 to accomplish the functionality described herein, in accordance with one embodiment. The user holds down the second actuator device 224 to move the arm 210 while establishing start/end locations (to initiate a recording cycle and to terminate the recording cycle using the first actuator device 222) and automatically recording operator path position points (spatial coordinate points) without having to manipulate an actuator device at each recorded point. In this manner, a user does not need to hold a teach pendant tablet, resulting in a more ergonomically friendly process for the user. In accordance with other embodiments, the actuator device 222 may be located elsewhere on the system (e.g., on the cobot arm or on the servo-mechanism apparatus 230).

Figure 5:
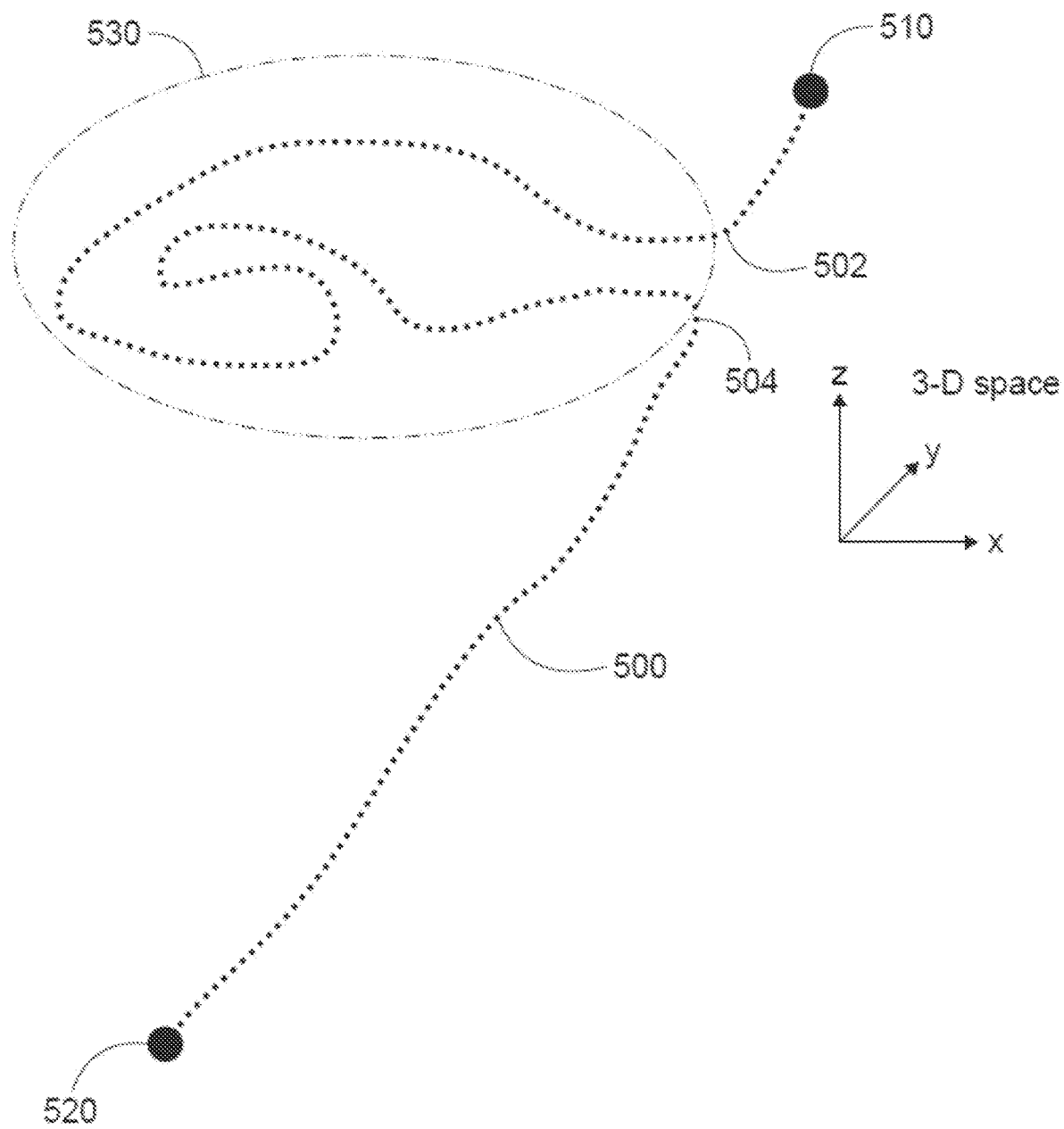
FIG. 5 illustrates an example of digitally recorded spatial position points of an operator path formed by an operator moving an arm of the collaborative robot of FIG. 2.

FIG. 5 illustrates an example of digitally recorded spatial points 500 (dotted line) of an operator path formed by an operator moving an arm 210 of the collaborative robot 200 of FIG. 2 in a 3D space of a defined coordinate system of the robot 200. The operator path of FIG. 5 has a start point 510 (where recording is started) and a destination point 520 where recording is ended. For example, in one embodiment, the operator path may be an ingress path from the start point 510 to the beginning of a weld joint position at the destination point 520. However as shown in FIG. 5, during the process of moving the robot arm 210 from the start point 510 to the destination point 520, the operator (for whatever reason) moved the robot arm 210 in an extraneous manner, instead of taking a more direct path. The portion of the recorded spatial points 500 within the depicted dotted-and-dashed oval 530 of FIG. 5 are extraneous spatial points. The extraneous spatial points are a result of extraneous movements of the arm 210 of the robot 200 by the operator and are not needed to accomplish moving from the start point 510 to the destination point 520 within the 3D space. For example, maybe the operator decided to re-orient an angular orientation of the torch 220, which resulted in the extraneous spatial points being recorded.

The programmable robot controller 320 is programmed to identify and eliminate the extraneous spatial points from the recorded spatial points 500, leaving a subset of the recorded spatial points 500. In one embodiment, the extraneous spatial points are identified by the robot controller 320 at least in part by the controller 320 analyzing the recorded spatial points 500 to determine which spatial points of the recorded spatial points as recorded are not needed to accomplish moving from the start point to the destination point within the 3D space. Referring to FIG. 5, the robot controller 320 would identify and eliminate the recorded spatial points within the dotted-and-dashed oval 530. The term "identify and eliminate" as used herein generally refers to differentiating the extraneous spatial points from the rest of the spatial points as originally recorded.

In accordance with one embodiment, initially identifying the extraneous spatial points may involve computing work space distance relationships and/or work space vector relationships for each recorded spatial point with respect to the start point and the destination point, and/or with respect to those recorded spatial points immediately surrounding or next to each recorded spatial point. Those recorded spatial points having distance relationships and/or vector relationships that are outside of some defined range(s) may be identified as extraneous spatial points. Other techniques of identifying the extraneous spatial points are possible as well, in accordance with other embodiments. Eliminating the extraneous spatial points, as identified, may involve deleting the extraneous spatial points from a computer memory, digitally flagging the extraneous spatial points as being extraneous, or some other technique, in accordance with various embodiments.

Once the extraneous spatial points are eliminated, the controller 320 can proceed to perform a spatial interpolation operation and/or a spatial smoothing operation on the remaining subset of the recorded spatial points. For example, additional spatial points may be generated via interpolation between certain recorded spatial points to fill in any gaps (e.g., between the recorded spatial points 502 and 504 in FIG. 5). More uniform time spacing between the recorded points can also be provided via temporal interpolation, for example. Then, the overall trajectory formed by the spatial points (as interpolated, if performed) can be smoothed, via a spatial smoothing operation, to eliminate any unwanted jerky or non-uniform motion from the trajectory. Furthermore, in accordance with one embodiment, programming of fine motion of the robot arm is automated during post processing (e.g., for weaving along the weld joint, or when the welding torch/gun is rounding a corner of a weld). Once the remaining recorded spatial points are interpolated and/or smoothed, the robot controller 320 automatically generates a motion program for the robot. During an actual welding or cutting operation, the motion program will command the robot to move such that resultant trajectory formed by the interpolated and/or smoothed spatial points is followed by the robot.

Figure 6:
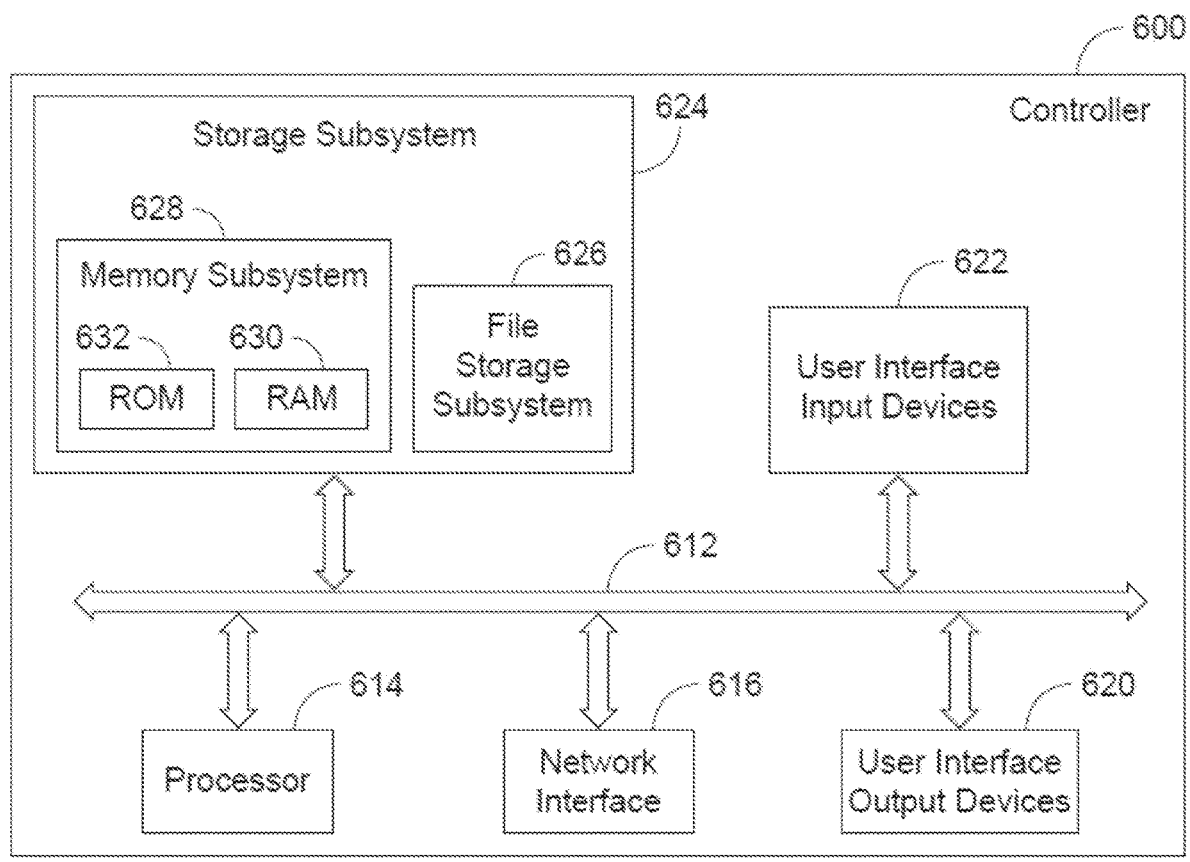
FIG. 6 illustrates a block diagram of an example embodiment of a controller that can be used, for example, in the welding system of FIG. 1.

FIG. 6 illustrates a block diagram of an example embodiment of a controller 600 that can be used, for example, in the welding system 100 of FIG. 1. For example, the controller 600 may be used as the robot controller 320 and/or as a controller in the welding power supply 310. Referring to FIG. 6, the controller 600 includes at least one processor 614 (e.g., a microprocessor, a central processing unit, a graphics processing unit) which communicates with a number of peripheral devices via bus subsystem 612. These peripheral devices may include a storage subsystem 624, including, for example, a memory subsystem 628 and a file storage subsystem 626, user interface input devices 622, user interface output devices 620, and a network interface subsystem 616. The input and output devices allow user interaction with the controller 600. Network interface subsystem 616 provides an interface to outside networks and is coupled to corresponding interface devices in other devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the controller 600 or onto a communication network.

User interface output devices 620 may include a display subsystem, a printer, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 600 to the user or to another machine or computer system.

Storage subsystem 624 stores programming and data constructs that provide some or all of the functionality described herein. For example, computer-executable instructions and data are generally executed by processor 614 alone or in combination with other processors. Memory 628 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a solid state drive, a floppy disk drive along with associated removable media, a CD-ROM drive, an optical drive, or removable media cartridges. The computer-executable instructions and data implementing the functionality of certain embodiments may be stored by file storage subsystem 626 in the storage subsystem 624, or in other machines accessible by the processor(s) 614.

Bus subsystem 612 provides a mechanism for letting the various components and subsystems of the controller 600 communicate with each other as intended. Although bus subsystem 612 is shown schematically as a single bus, alternative embodiments of the bus subsystem may use multiple buses.

The controller 600 can be of varying types. Due to the ever-changing nature of computing devices and networks, the description of the controller 600 depicted in FIG. 6 is intended only as a specific example for purposes of illustrating some embodiments. Many other configurations of a controller are possible, having more or fewer components than the controller 600 depicted in FIG. 6.

In one embodiment, the start point and the destination point of a weld is recorded. A data base is accessed to indicate how to set the various angles, stick out, etc., based on visually (e.g., optically) observing the weld joint to determine what type of weld is to be created. For example, a camera or a light detection and ranging (Lidar) capability may be employed. Alternatively, a weld wire sensing technique may be used to determine the type of weld (e.g., see U.S. Published Patent Application No. 2020/0139474 A1 which is incorporated herein by reference it its entirety).

In one embodiment, the automatic recording and filtering of "air move" trajectories between welds is performed. In this manner the operator (user) can focus mainly on the creation of welds (starts, in-between points, and ends), not so much on the creation of points in the air as the cobot TCP moves to (ingress) and away from (egress) a weld.

In one embodiment, air motion of the cobot is recorded as a means to map free space around the cobot. All "air move" trajectories are recorded to help build a map of the entire cobot workspace (free space). For a given part to be welded, this information can be used to generate collision-free trajectories, for example, from one weld to another using established path planning algorithms.

Free space is anywhere the cobot can be located in space as the arm moves. The 3D geometry of all of the arm joints of the cobot is observed as the cobot moves through space. Any space the cobot has moved through (a swept volume) is considered to be free space. This allows for the planning of new motion that will be collision-free because the new path will be somewhere within the swept volume. The work space is effectively mapped per part (per welding setup for a part positioned in a certain way).

A swept volume is determined, in part, by capturing locations of the joints of the cobot (e.g., x, y, z location and roll, pitch, yaw of the joints). Also, the cobot arm is represented in coordinate system space by, for example, 3D geometrical volumes (e.g., cylinders and rectangular boxes that take up space). The system keeps track of where these 3D geometrical volumes are free to move, as the joints of the cobot arm move, via coordinate transformation math. Therefore, every recorded point of where the cobot arm is and how it is positioned is correlated with a volume in space formed by the 3D geometrical volumes representing the cobot arm (i.e., the space that the cobot is occupying for that torch point). This volume is recorded and will form a part of a swept volume when merged with volumes corresponding to other points. Many such recorded swept volumes are merged to determine a 3D geometry representing a collision-free space.

Once a free space is determined, the user can position the torch on the end of the cobot wherever he wants and however he wants in the air to get from one weld to another. A path planning algorithm in the cobot will determine, in an optimal manner, how the torch and cobot arm should be positioned within the free space to get from the one weld to another such that collisions are avoided. This has applications during welding as well. The user can position the torch on the end of the cobot arm at points along a weld path to define a weld path (or just a start point and an end point of the weld path). The algorithm in the cobot will determine how the torch and cobot arm should be positioned within the free space to traverse the path such that collisions are avoided. For example, the algorithm can make torch angle corrections, making sure to avoid collisions.

In various embodiments, the operator can move the cobot all around the part and weld joints, before welding, to identify the free space, or the operator can just teach the welds for the part and rely on those air and weld trajectories to define the free space. In one embodiment, the cobot is deliberately allowed to collide with objects in the workspace of the cobot to find and learn a collision-free trajectory. It has been observed that cobot collisions are harmless, unlike traditional industrial robots. Recording of air motion while an operator moves the arm of the cobot within the workspace is not performed in this case. Instead, the welds are created and the cobot attempts to move its arm between the welds (from one weld to another) without regard for collisions. If the cobot collides on its way to the next weld, the cobot can modify its programmed trajectory in an attempt to find a collision-free trajectory. Information from any collision itself (e.g., colliding forces) can be used.

Cobots have sensitive torque sensors and feel neutral relative to gravity. A vector of force put on the cobot is sensed and the cobot assists in counter-acting gravity, making it easy for a user to move the cobot arm around. A user may teach an ingress to a position on a weld joint by positioning the torch at the position on the weld joint, but not teach the optimal torch angle. As the cobot attempts to correct the torch angle/orientation as part of the ingress, the cobot might collide with something. A force vector is provided of how the cobot collided with the object during the ingress. The cobot can then use its extra degrees of freedom to try to keep away from the object while ingressing to the taught position, but at a correct torch angle/orientation.

In one embodiment, the cobot is simply left with the part and the cobot is programmed to move around on its own, touching the part at different points and colliding into things, learning where the free space is located. Therefore, when the user goes to move the cobot arm and torch during ingress to a point (or egress from a point) on the weld, the cobot already has the free space information it needs to provide an optimal ingress/egress path to the point that is collision-free and puts the torch at the optimal angle and orientation. The cobot arm is essentially being used as a 3D scanner.

Also, the user could ingress the cobot arm to a start point of a weld, regardless of angle and orientation. Then the cobot can access what the ideal, stored angle and orientation is for that point on that type of weld. When the cobot attempts on its own to ingress to that point, it may encounter one or more collisions. The cobot can then attempt to re-orient the arm upon ingress, until it finds a collision-free ingress path to that point that allows the ideal, stored angle and orientation to be achieved at the point.

In one embodiment, an inertial measurement unit (IMU) is placed on the torch to sense collisions at the torch instead of having to go through the mechanism of the robot to sense the collisions and get force vectors from the robot (would have to otherwise read torques from the motors of the robot). Also, an IMU on the torch can help with keeping torch angles correct while welding. For example, the IMU can provide live updates to the user about current torch angle/orientation relative to gravity and tell the user the actual orientation at which the weld is happening compared to what it was set to before welding began. Such information could be provided to the user via a display means. Alternatively, the cobot could be informed of any discrepancy and make adjustments to torch angles (to correspond to the ideally set torch angles) as it proceeds with welding. The IMU could send its data to the welding system, or the cobot controller, or a PC that gets hooked up to the cobot. There could be multiple different architectures that might achieve this. For example, there can be analog signals out of the IMU that get converted to digital signals representing angles/orientations/accelerations at some point, which eventually get communicated to the cobot controller.

Figure 7:
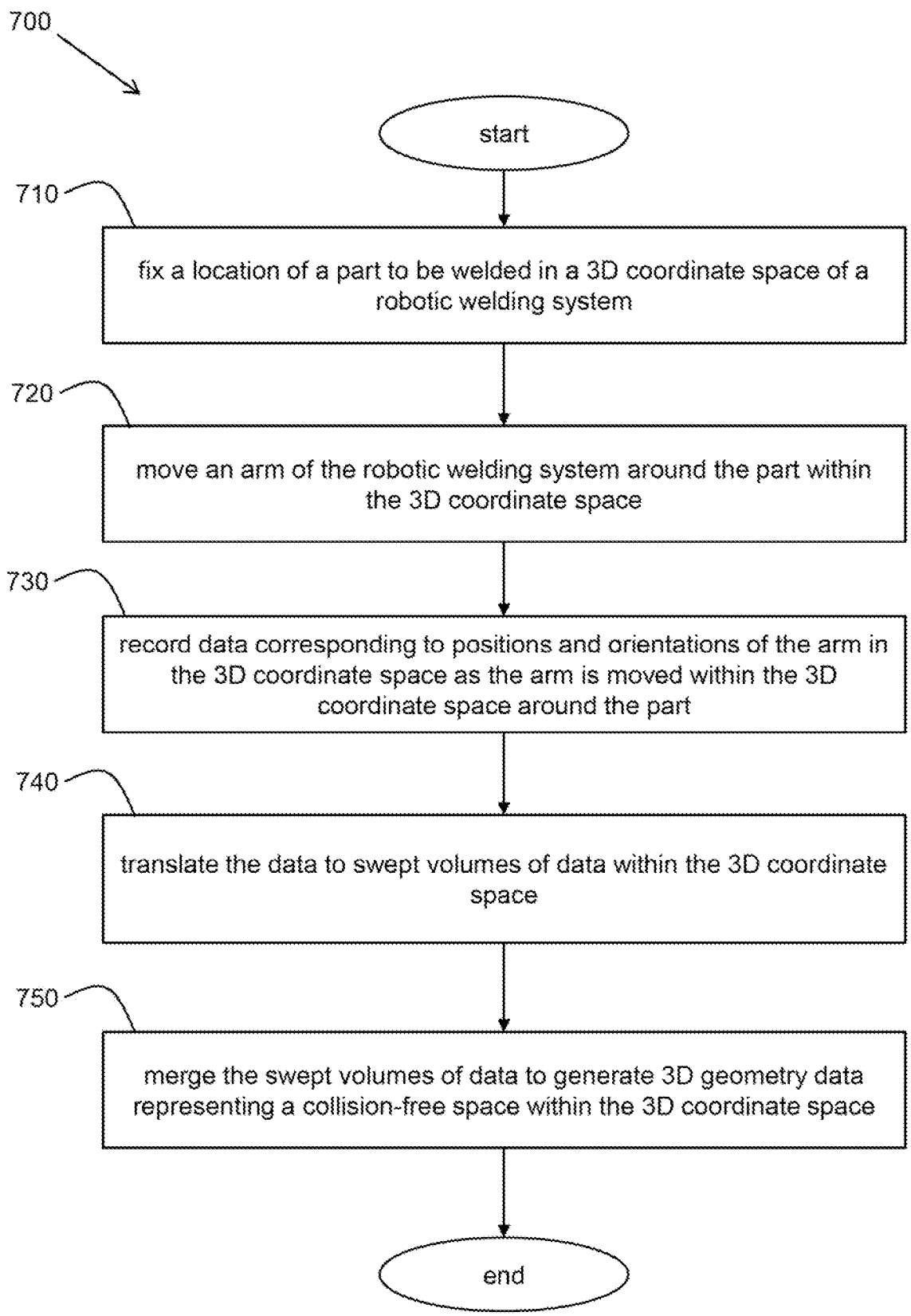
FIG. 7 illustrates a flowchart of one embodiment of a method of determining a collision-free space for a robotic welding system.
Figure 8:
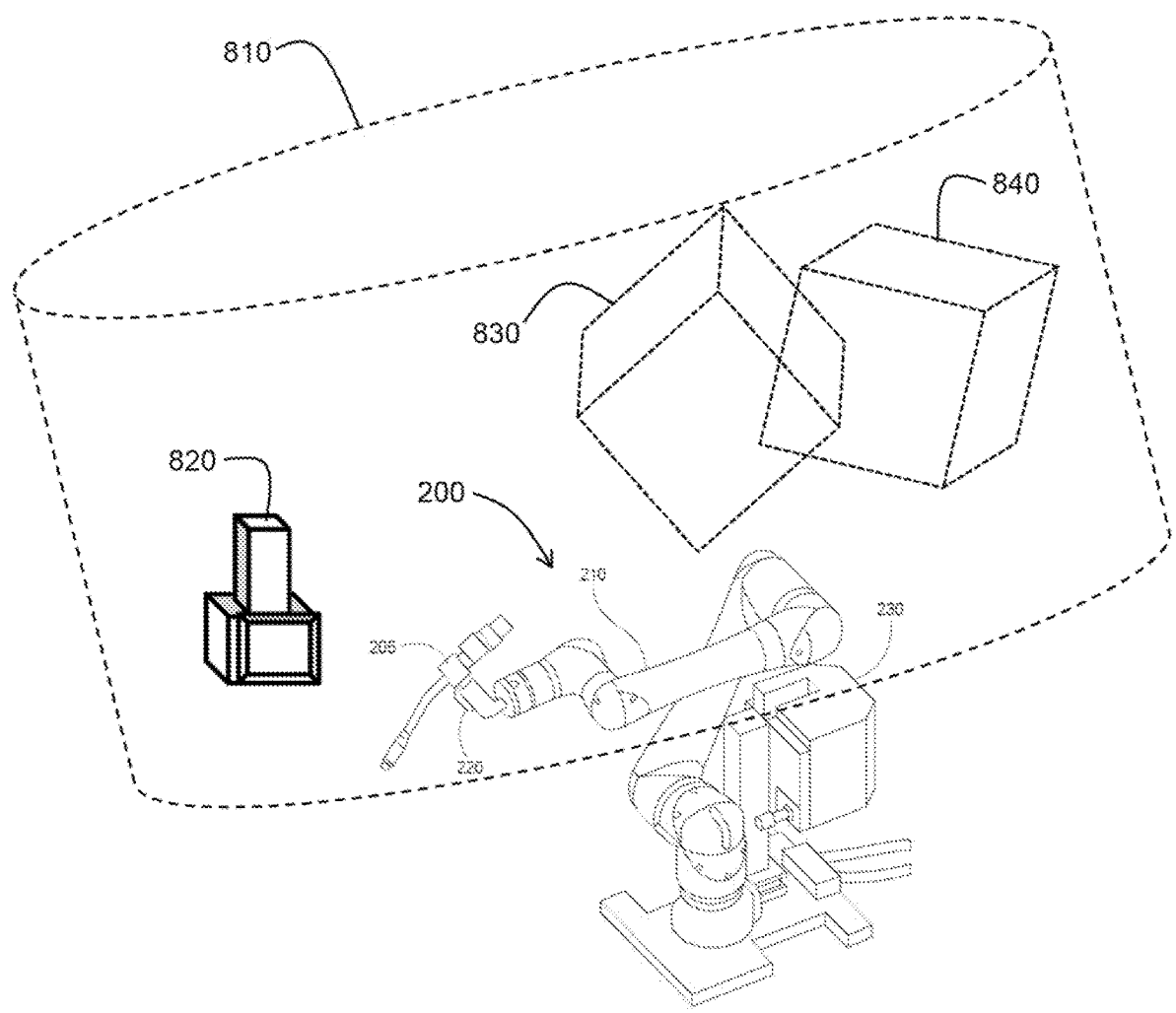
FIG. 8 illustrates a 3D geometry representing a collision-free space within a 3D coordinate space having a robotic welding system (just showing the cobot portion) and a part to be welded.

Referring again to the drawings, FIG. 7 illustrates a flowchart of one embodiment of a method 700 of determining a collision-free space for a robotic welding system. At block 710, the method includes fixing a location of a part to be welded in a 3D coordinate space of a robotic welding system. FIG. 8 illustrates a 3D geometry representing a collision-free space 810 within a 3D coordinate space having a cobot 200 (of a robotic welding system) and a part to be welded 820. In one embodiment, the part 820 is fixed (e.g., on a welding table) within the 3D coordinate space. In another embodiment, the part 820 may be fixed in place as it is being held by a positioning mechanism.

Again, collision-free space is anywhere the robotic welding system can be located in space. The 3D geometry of all of the arm joints of the cobot is observed as the cobot moves through space. Anywhere the arm and torch has been (a swept volume) is considered to be free space. At block 720 of the method 700, an arm 210 of the robotic welding system is moved around the part 820 within the 3D coordinate space. At block 730, data corresponding to positions and orientations of the arm 210 in the 3D coordinate space are recorded as the arm 210 is moved within the 3D coordinate space around the part 820. At block 740, the data is translated to swept volumes of data within the 3D coordinate space. FIG. 8 shows examples of two swept volumes 830 and 840 within the 3D coordinate space. At block 750 of the method 700, all of the swept volumes of data (not just swept volumes 830 and 840) are merged to generate 3D geometry data representing the continuous collision-free space 810 within the 3D coordinate space.

Figure 9:
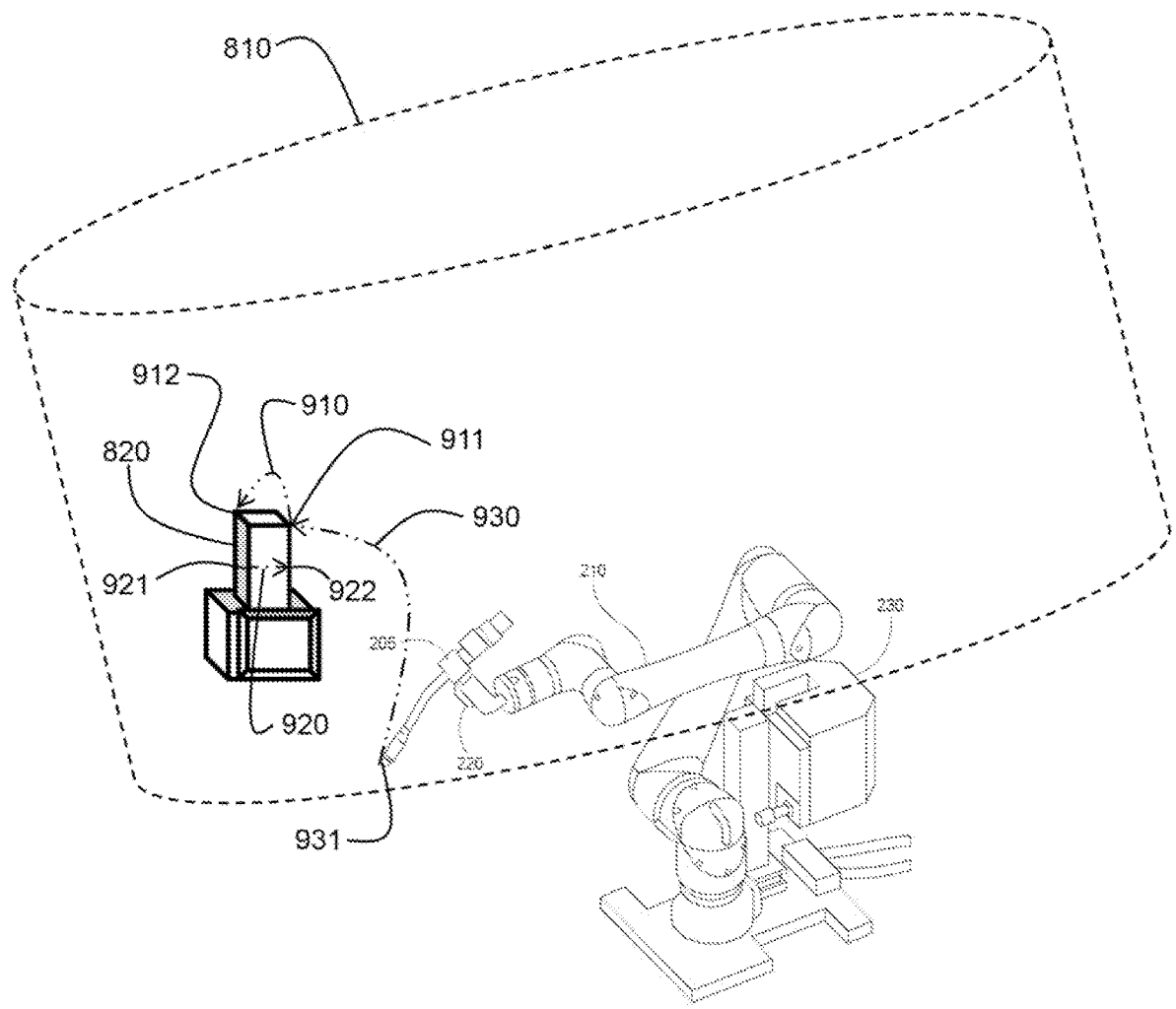
FIG. 9 illustrates several planned collision-free paths within the collision-free space of FIG. 8.

The method may further include planning a collision-free motion path of the arm through the 3D coordinate space using at least the 3D geometry data representing the continuous collision-free space 810. FIG. 9 illustrates several planned collision-free paths within the continuous collision-free space 810 of FIG. 8. For example, referring to FIG. 9, the method may include planning a collision-free air motion path 910 within the 3D coordinate space from an end point 911 of a first weld seam of the part 820 to a start point 912 of a second weld seam of the part 820 using position data of the end point 911, position data of the start point 912, and the 3D geometry data representing the continuous collision-free space 810. As another example, again referring to FIG. 9, the method may include planning a collision-free welding path 920 within the 3D coordinate space from a start point 921 of a weld seam of the part 820 to an end point 922 of the weld seam of the part 820 using at least position data of the start point 921, position data of the end point 922, and the 3D geometry data representing the continuous collision-free space 810. As a further example, referring to FIG. 9, the method may include planning a collision-free air motion path 930 within the 3D coordinate space from a point 931 away from the part 820 to the point 911 of the first weld seam of the part 820 using at least position data of the point 931, position data of the point 911, and the 3D geometry data representing the continuous collision-free space 810.

Figure 10:
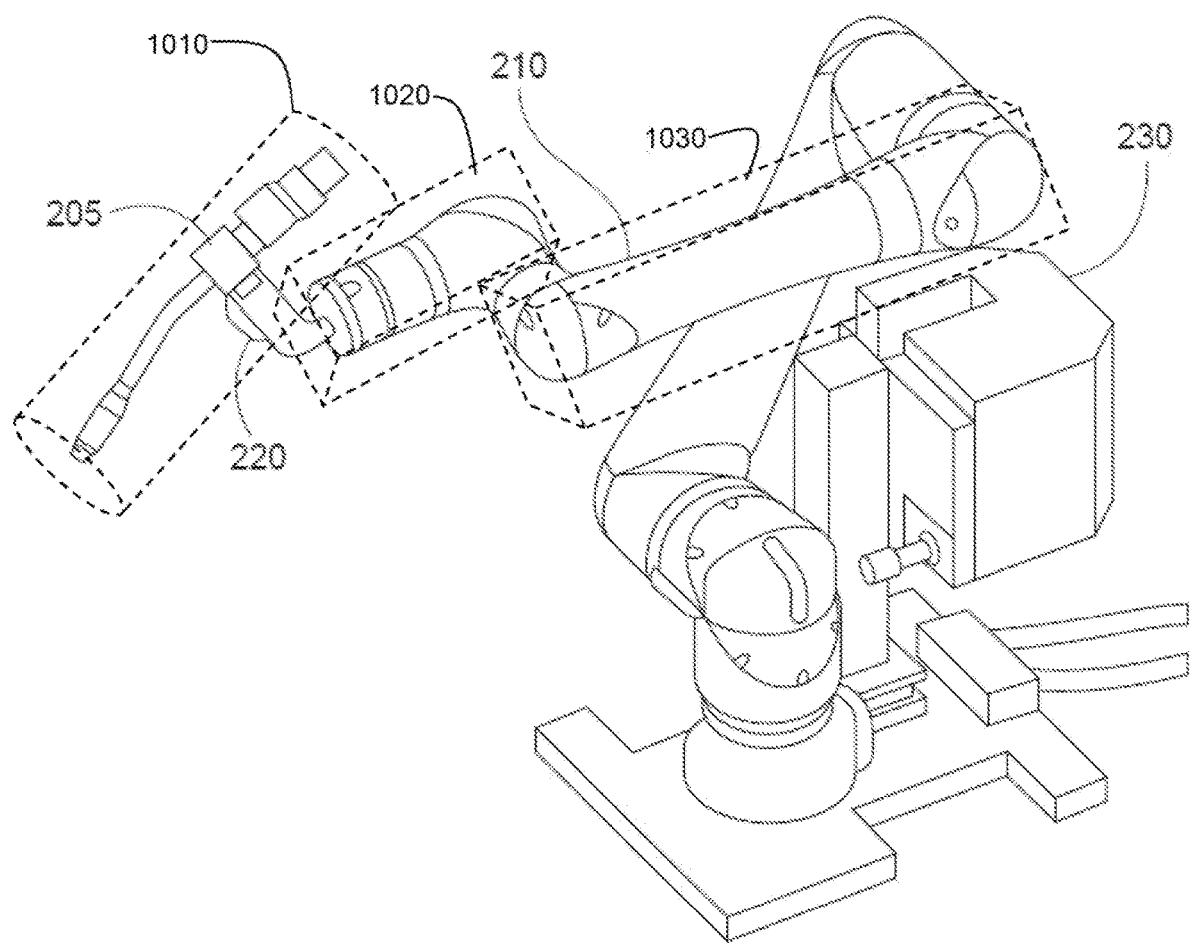
FIG. 10 illustrates one embodiment of how portions of the arm of the robotic welding system cobot of FIG. 2 may be represented in a coordinate system space by 3D geometric volumes.

In one embodiment, the arm of the robotic welding system is represented by the robotic welding system as 3D geometric volumes that occupy space within the 3D coordinate space. For example, FIG. 10 illustrates one embodiment of how portions of the arm 210 of the robotic welding system cobot 200 of FIG. 2 may be represented in a coordinate system space by 3D geometric volumes. Each 3D geometric volume 1010, 1020, and 1030 (shown in dashed lines in FIG. 10) represents a portion of the arm of the robotic welding system cobot 200 (including the torch 220 in one embodiment). The 3D geometric volumes are represented as volume data in 3D coordinate space within the controller of the robotic welding system, in accordance with one embodiment.

Figure 11:
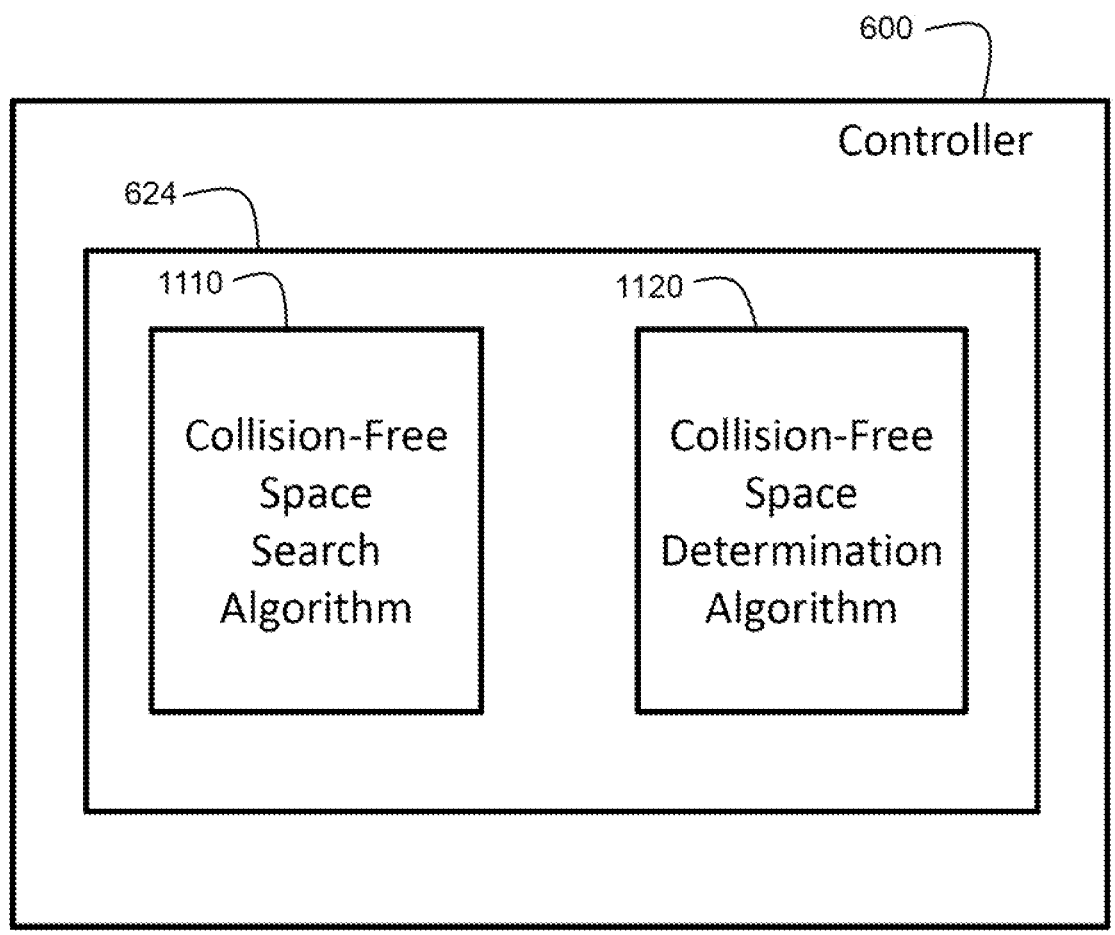
FIG. 11 illustrates a portion of the controller of FIG. 6 having stored therein a collision-free space search algorithm and a collision-free space determination algorithm.

Moving the arm 210 of the robotic welding system around the part 820 within the 3D coordinate space may be accomplished manually by a user in one embodiment (i.e., by the user grabbing and moving the arm 210 as described herein) to find a collision-free space. Alternatively, FIG. 11 illustrates a portion of the controller of FIG. 6 (e.g., being used as the controller 320 of FIG. 1) having stored therein a collision-free space search algorithm 1110 and a collision-free space determination algorithm 1120. Therefore, moving the arm 210 of the robotic welding system around the part 820 within the 3D coordinate space may be accomplished automatically by the controller 600 of the robotic welding system running the collision-free space search algorithm 1110, in accordance with one embodiment. The collision-free space search algorithm 1110 commands the arm 210 to move around within the 3D coordinate space, running into objects that are present, to generate swept volumes as described herein.

In one embodiment, the recording, translating, and merging steps of the method 700 are accomplished by the controller 600 of the robotic welding system by running the collision-free space determination algorithm 1120. In one embodiment, the data corresponding to the positions and the orientations of the arm 210 in the 3D coordinate space are represented by x, y, z location data and roll, pitch, yaw orientation data. Coordinate transformation mathematics is performed by the controller 600 of the robotic welding system to accomplish the translating and the merging, in accordance with one embodiment. The result is a 3D geometry (e.g., representing the continuous collision-free space 810) within the 3D coordinate space. Data representing the continuous collision-free space is stored in a memory of the controller 600, in accordance with one embodiment.

In one embodiment, a part to be welded may be moved by a positioner mechanism during welding. The robotic welding system knows how the part is being moved in time (e.g., when the positioner mechanism is kinematically controlled by the robotic welding system . . . the kinematic chain of the robotic welding system includes the positioner mechanism). The robotic welding system knows where the part and positioner are located. That is, the robotic welding system knows the positions and orientations of the joints of the positioner mechanism as well as the positions and orientations of the joints of the cobot arm of the robotic welding system, which are in the form of higher-dimensional joint space data.

The term "higher-dimensional" as used herein refers to the dimensions or number of axes-of-motion of the cobot in combination with the dimensions or number of axes-of-motion of the positioner mechanism (the total number of dimensions is higher than that of the cobot alone). For example, a cobot may have three axes-of-motion defining a baseline of three-dimensions. A positioner mechanism may have two axes-of-motion, for example. Together, the cobot and the positioner mechanism have five axes-of-motion that operate in a higher-dimensional joint space of five dimensions.

The cobot and the positioner mechanism can move in a coordinated manner with respect to each other to search a welding environment, and continuous higher-dimensional volume space data can be generated from the higher-dimensional joint space data recorded during the movement. The higher-dimensional volume space data represents collision-free configurations of the cobot and the positioner mechanism. In one embodiment, the higher-dimensional joint space data corresponding to combined positions and orientations of joints of the arm and joints of the positioner mechanism are represented by x, y, z location data and roll, pitch, yaw orientation data. The positioner mechanism concept is discussed further herein with respect to FIG. 12 and FIG. 13.

Figure 12:
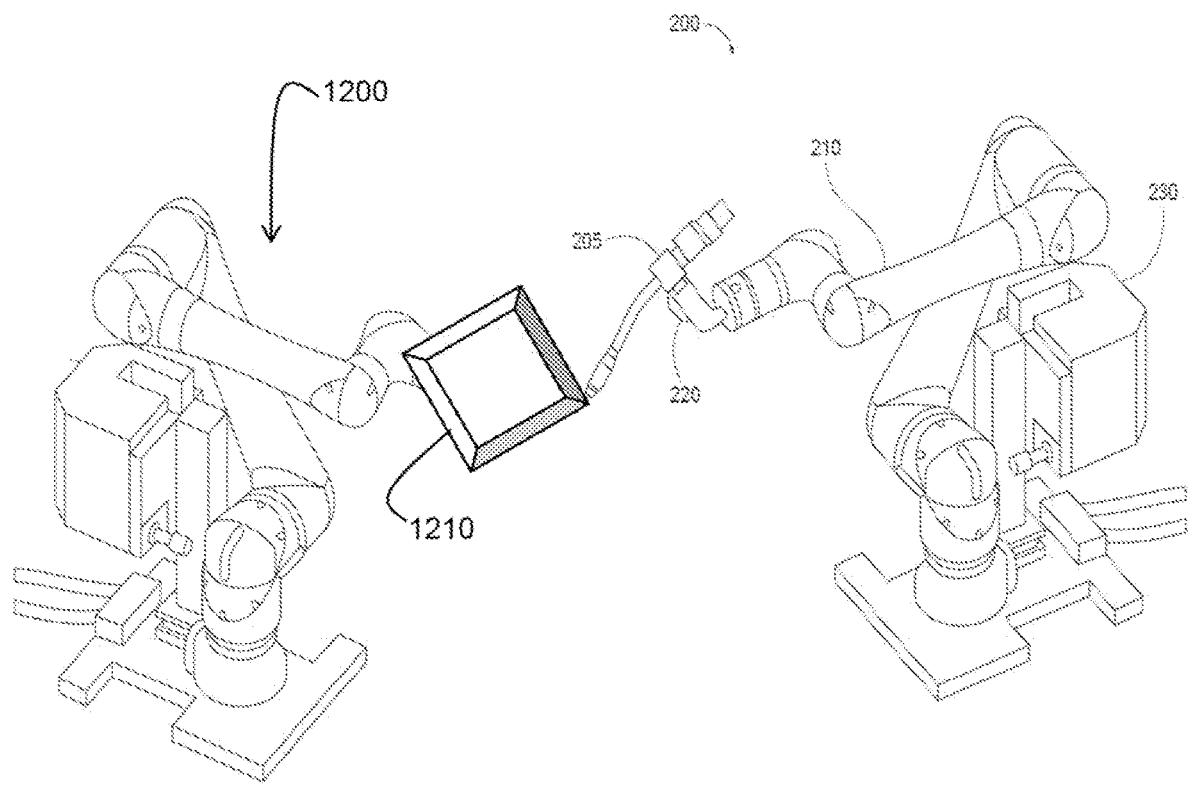
FIG. 12 illustrates one embodiment of the collaborative robot (of a robotic welding system) of FIG. 2 within a 3D space along with a positioner mechanism for holding and moving a part to be welded within the 3D space.
Figure 13:
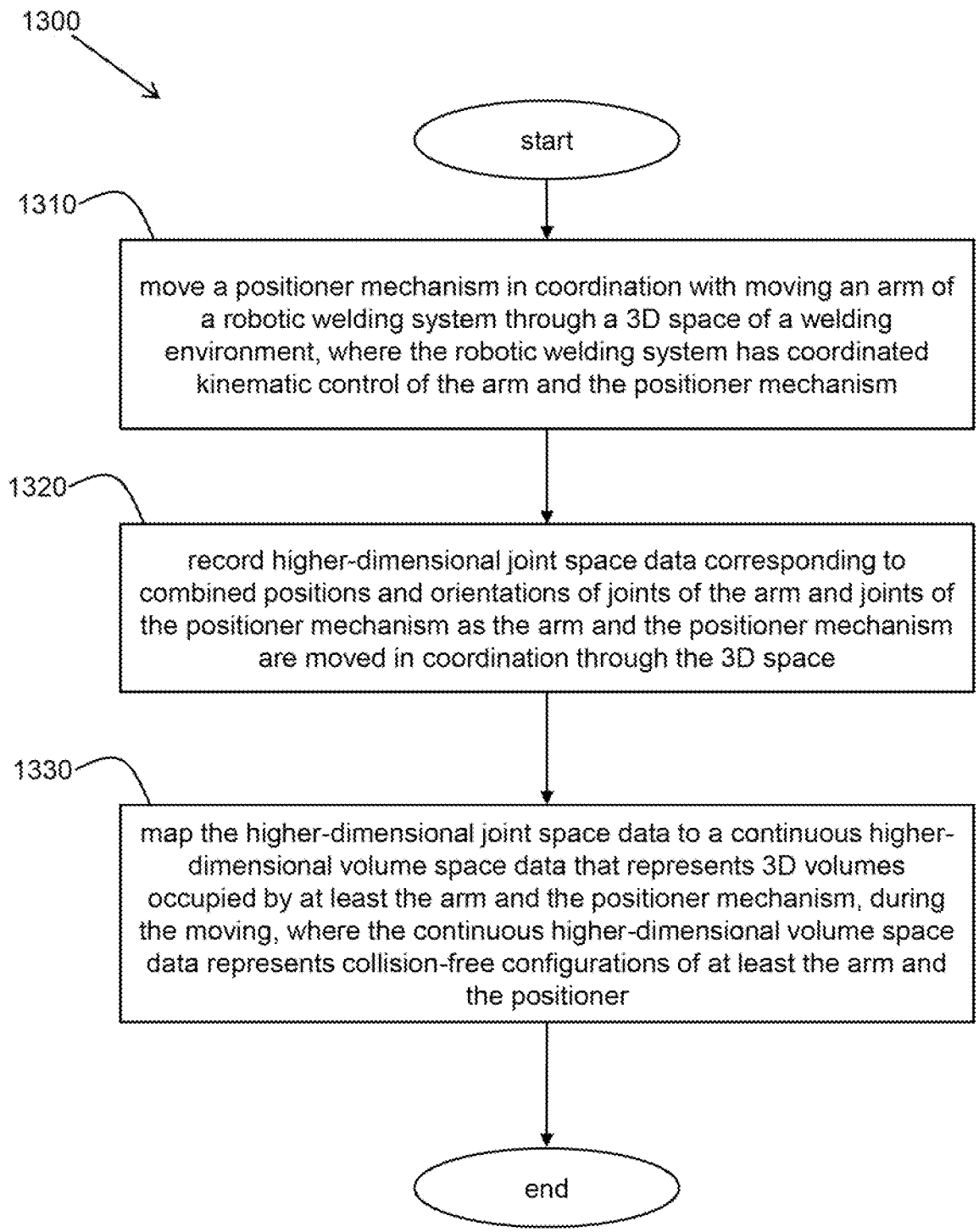
FIG. 13 illustrates a flowchart of one embodiment of a method of determining continuous higher-dimensional volume space data representing collision-free configurations for a robotic welding system and a positioner mechanism for holding and moving a part to be welded.

FIG. 12 illustrates one embodiment of the collaborative robot 200 (of a robotic welding system) of FIG. 2 within a 3D space along with a positioner mechanism 1200 for holding and moving a part 1210 to be welded within the 3D space. In one embodiment, the positioner mechanism 1200 is another cobot that is controlled by the robotic welding system 100. In one embodiment, the arm 210 is holding a welding tool 220. FIG. 13 illustrates a flowchart of one embodiment of a method 1300 of determining continuous higher-dimensional volume space data representing collision-free configurations for a robotic welding system 100 and a positioner mechanism 1200 for holding and moving a part 1200 to be welded.

In block 1310, the method 1300 includes moving a positioner mechanism 1200 in coordination with moving an arm 210 of a robotic welding system 100 through a 3D space of a welding environment. The positioner mechanism 1200 is holding a part 1210 to be welded and the arm 210 is holding a welding tool 220, in one embodiment. The robotic welding system 100 has coordinated kinematic control of the arm 210 and the positioner mechanism 1200. In one embodiment, moving the arm 210 of the robotic welding system 100 in coordination with the positioner mechanism 1200 within the 3D space is accomplished automatically by a controller 320 of the robotic welding system 100 running a collision-free space search algorithm 1110. At block 1320, record higher-dimensional joint space data corresponding to combined positions and orientations of joints of the arm 210 and joints of the positioner mechanism 1200 as the arm 210 and the positioner mechanism 1200 are moved in coordination through the 3D space. The higher-dimensional joint space data, corresponding to combined positions and orientations of joints of the arm 210 and joints of the positioner mechanism 1200, are represented by x, y, z location data and roll, pitch, yaw orientation data, in accordance with one embodiment.

At block 1330, map the higher-dimensional joint space data to a continuous higher-dimensional volume space data that represents 3D volumes occupied by at least the arm 210 and the positioner mechanism 1200 during the moving. At least the arm 210 of the robotic welding system 100 and the positioner mechanism 1200 may be represented within the robotic welding system 100 as data of 3D geometric volumes that occupy the 3D space (e.g., as shown for the arm 210 in FIG. 10), in order to help with the mapping to the continuous higher-dimensional volume space. The continuous higher-dimensional volume space data represents collision-free configurations of at least the arm 210 and the positioner mechanism 1200. The recording and mapping are accomplished by a controller 320 of the robotic welding system 100 running a collision-free space determination algorithm 1120, in accordance with one embodiment. Coordinate transformation mathematics is performed by a controller 320 of the robotic welding system 100 to accomplish the mapping, in accordance with one embodiment.

In one embodiment, a collision-free motion path of the arm 210 and the positioner mechanism 1200 through the 3D space is planned (by a path planning algorithm) using at least the continuous higher-dimensional volume space data representing the collision-free configurations. For example, in one embodiment, a collision-free air motion path within the 3D space is planned (by a path planning algorithm) from an end point of a first weld seam of the part 1210 to be welded to a start point of a second weld seam of the part 1210 to be welded using position data of the end point, position data of the start point, and the continuous higher-dimensional volume space data representing the collision-free configurations. In one embodiment, a collision-free welding path within the 3D space is planned (by a path planning algorithm) from a start point of a weld seam of the part 1210 to be welded to an end point of the weld seam of the part 1210 to be welded using at least position data of the start point, position data of the end point, and the continuous higher-dimensional volume space data representing the collision-free configurations.

In one embodiment, a "weld database" containing information about plate angles, torch angles, work angles, stick out, etc. is provided to achieve a particular robotic weld. In one embodiment, a search strategy is automatically generated (tactile or with a more advanced sensor such as a small camera or a Lidar capability) to accurately locate the weld joint in space during production, where the part tolerances may vary from part to part. In one embodiment, the weld joint is automatically located during the programming process for a new part to be programmed by locating the weld wire (or other sensor) "close enough" to the weld joint and using a predetermined search strategy to locate the wire more precisely within the weld joint.

One embodiment provides advanced 3D sensing/scanning for weld feature recognition. In one embodiment, the volumes and high mix production present in the cobot space are exploited as training data to train the cobot to recognize weld joints. Training data can be gathered from many cobots within a manufacturing space. There is access to two pieces of information from which to train a machine learning (ML) model: 1) 3D sensor information, 2) Information about how the user taught a particular weld joint (i.e., torch angles, weld type, etc.). Such a model can be used to predict torch angles, weld types, etc., given information from a 3D sensor. The system can offer suggestions benefiting the end-user while also gathering the information necessary to build such an ML model.

Embodiments of the present invention are not limited to cobots. Other embodiments employing industrial robots are possible as well. For example, a user may use a teach pendant to get a robot close in to a joint, and then let the robot automatically perform a fine tuning of position and orientation at the joint. For example, a touch-sensing technique may be performed as discussed in U.S. Pat. No. 9,833,857 B2 which is incorporated by reference herein in its entirety.

In one embodiment, a database is queried upon weld creation to get basic parameters for the type of weld joint. A user gets the welding wire close within the weld joint at a position (cobot via user arm, or robot using teach pendant), then lets the cobot/robot do a search routine to achieve a more fine-tuned positioning within the weld joint (robot knows joint type and other parameters, from database, and performs a corresponding search strategy). This is done for each position across the weld joint.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of the appended claims, which satisfy the statutory subject matter requirements of 35 U.S.C. § 101. The above description of specific embodiments has been given by way of example. From the disclosure given, those skilled in the art will not only understand the general inventive concepts and attendant advantages, but will also find apparent various changes and modifications to the structures and methods disclosed. It is sought, therefore, to cover all such changes and modifications as fall within the spirit and scope of the general inventive concepts, as defined by the appended claims, and equivalents thereof.

What is claimed is:

1. A method of determining a collision-free space for a robotic welding system, the method comprising:

fixing a location of a part to be welded in a 3D coordinate space of a robotic welding system;

moving an arm of the robotic welding system around the part within the 3D coordinate space;

recording data corresponding to positions and orientations of the arm in the 3D coordinate space as the arm is moved within the 3D coordinate space around the part;

translating the data to swept volumes of data within the 3D coordinate space; and merging the swept volumes of data to generate 3D geometry data representing a continuous collision-free space within the 3D coordinate space.

2. The method of claim 1, further comprising planning a collision-free motion path of the arm through the 3D coordinate space using at least the 3D geometry data representing the continuous collision-free space.

3. The method of claim 1, further comprising planning a collision-free air motion path within the 3D coordinate space from an end point of a first weld seam of the part to a start point of a second weld seam of the part using position data of the end point, position data of the start point, and the 3D geometry data representing the continuous collision-free space.

4. The method of claim 1, further comprising planning a collision-free welding path within the 3D coordinate space from a start point of a weld seam of the part to an end point of the weld seam of the part using at least position data of the start point, position data of the end point, and the 3D geometry data representing the continuous collision-free space.

5. The method of claim 1, wherein the arm of the robotic welding system is represented by the robotic welding system as data of 3D geometric volumes that occupy space within the 3D coordinate space.

6. The method of claim 1, wherein moving the arm of the robotic welding system around the part within the 3D coordinate space is accomplished manually by a user.

7. The method of claim 1, wherein moving the arm of the robotic welding system around the part within the 3D coordinate space is accomplished automatically by a controller of the robotic welding system running a collision-free space search algorithm.

8. The method of claim 1, wherein the recording, translating, and merging are accomplished by a controller of the robotic welding system running a collision-free space determination algorithm.

9. The method of claim 1, wherein the data corresponding to the positions and the orientations of the arm in the 3D coordinate space are represented by x, y, z location data and roll, pitch, yaw orientation data corresponding to joints of the arm.

10. The method of claim 1, wherein coordinate transformation mathematics is performed by a controller of the robotic welding system to accomplish the translating and the merging.

11. A method of determining a collision-free space for a robotic welding system, the method comprising:

moving a positioner mechanism in coordination with moving an arm of a robotic welding system through a 3D space of a welding environment, wherein the robotic welding system has coordinated kinematic control of the arm and the positioner mechanism;

recording higher-dimensional joint space data corresponding to combined positions and orientations of joints of the arm and joints of the positioner mechanism as the arm and the positioner mechanism are moved in coordination through the 3D space; and mapping the higher-dimensional joint space data to a continuous higher-dimensional volume space data that represents 3D volumes occupied by at least the arm and the positioner mechanism, during the moving, wherein the continuous higher-dimensional volume space data represents collision-free configurations of at least the arm and the positioner mechanism.

12. The method of claim 11, further comprising planning a collision-free motion path of the arm and the positioner mechanism through the 3D space using at least the continuous higher-dimensional volume space data representing the collision-free configurations.

13. The method of claim 11, further comprising planning a collision-free air motion path within the 3D space from an end point of a first weld seam of a part, being held by the positioner mechanism, to a start point of a second weld seam of the part using position data of the end point, position data of the start point, and the continuous higher-dimensional volume space data representing the collision-free configurations.

14. The method of claim 11, further comprising planning a collision-free welding path within the 3D space from a start point of a weld seam of a part, being held by the positioner mechanism, to an end point of the weld seam of the part using at least position data of the start point, position data of the end point, and the continuous higher-dimensional volume space data representing the collision-free configurations.

15. The method of claim 11, wherein the arm of the robotic welding system and the positioner mechanism are represented within the robotic welding system as data of 3D geometric volumes that occupy the 3D space.

16. The method of claim 11, wherein moving the arm of the robotic welding system in coordination with the positioner mechanism within the 3D space is accomplished automatically by a controller of the robotic welding system running a collision-free space search algorithm.

17. The method of claim 11, wherein the recording and mapping are accomplished by a controller of the robotic welding system running a collision-free space determination algorithm.

18. The method of claim 11, wherein the higher-dimensional joint space data corresponding to combined positions and orientations of joints of the arm and joints of the positioner mechanism are represented by x, y, z location data and roll, pitch, yaw orientation data.

19. The method of claim 11, wherein coordinate transformation mathematics is performed by a controller of the robotic welding system to accomplish the mapping.

20. The method of claim 11, wherein the arm is holding a welding tool and the positioner mechanism is holding a part to be welded.

* * * * *